United States Patent
Tsirkin et al.

(10) Patent No.: US 11,900,142 B2
(45) Date of Patent: Feb. 13, 2024

(54) IMPROVING MEMORY ACCESS HANDLING FOR NESTED VIRTUAL MACHINES

(71) Applicant: RED HAT, INC., Raleigh, NC (US)

(72) Inventors: Michael Tsirkin, Ra'anana (IL); Amnon Ilan, Ra'anana (IL)

(73) Assignee: Red Hat, Inc., Raleigh, NC (US)

( * ) Notice: Subject to any disclaimer, the term of this patent is extended or adjusted under 35 U.S.C. 154(b) by 317 days.

(21) Appl. No.: 17/349,441

(22) Filed: Jun. 16, 2021

(65) Prior Publication Data

US 2022/0405111 A1 Dec. 22, 2022

(51) Int. Cl.
*G06F 9/455* (2018.01)
*G06F 12/1009* (2016.01)

(52) U.S. Cl.
CPC ...... *G06F 9/45558* (2013.01); *G06F 9/45545* (2013.01); *G06F 12/1009* (2013.01); *G06F 2009/45566* (2013.01); *G06F 2009/45579* (2013.01); *G06F 2009/45583* (2013.01)

(58) Field of Classification Search
CPC ............. G06F 9/45558; G06F 9/45545; G06F 12/1009; G06F 2009/45566; G06F 2009/45579; G06F 2009/45583
See application file for complete search history.

(56) References Cited

U.S. PATENT DOCUMENTS

| | | | |
|---|---|---|---|
| 8,788,763 B2 | 7/2014 | Arges et al. | |
| 10,324,863 B2 | 6/2019 | Lemay et al. | |
| 10,447,728 B1 | 10/2019 | Steinberg | |
| 2009/0013149 A1* | 1/2009 | Uhlig | G06F 12/109 711/E12.001 |
| 2012/0131571 A1* | 5/2012 | Ben-Yehuda | G06F 9/45558 718/1 |

FOREIGN PATENT DOCUMENTS

| | | |
|---|---|---|
| CN | 102498478 B | 4/2015 |
| KR | 101950000 B1 | 2/2019 |

OTHER PUBLICATIONS

Michael Beham, Intrusion Detection and Honeypots in Nested Virtualization Environments, 2013, IEEE (Year: 2013).*
Amit et al., "vIOMMU: Efficient IOMMU Emulation", Technion & IBM Research; Technion, 14 pages. https://www.usenix.org/legacy/event/atc11/tech/final_files/Amit.pdf.
Markuze et al., "DAMN: Overhead-Free IOMMU Protection for Networking", Technion—Israel Institute of Technology; Tel Aviv University; VMware Research Group, Mar. 24-28, 2018, 15 pages. https://www.cs.tau.ac.il/~mad/publications/asplos2018-damn.pdf.

* cited by examiner

*Primary Examiner* — Dong U Kim
(74) *Attorney, Agent, or Firm* — Lowenstein Sandler LLP

(57) ABSTRACT

Systems and methods for memory management for nested virtual machines. An example method may comprise running, by a host computer system, a Level 0 hypervisor managing a Level 1 virtual machine running a Level 1 hypervisor, wherein the Level 1 hypervisor manages a Level 2 virtual machine, wherein the Level 2 virtual machine is associated with a Peripheral Component Interconnect (PCI) device; generating, by the Level 0 hypervisor, a Level 1 page table by combining records from the guest page table with records from a host page table maintained by the Level 0 hypervisor; generating a Level 2 page table comprising a plurality of Level 2 page table entries; and causing a device driver of the Level 2 virtual machine to use the Level 2 page table for second level address translation.

20 Claims, 7 Drawing Sheets

IMPROVING MEMORY ACCESS HANDLING FOR NESTED VIRTUAL MACHINES

TECHNICAL FIELD

The present disclosure is generally related to virtualized computer systems, and more particularly, to improving memory access handling for nested virtual machines.

BACKGROUND

Virtualization herein shall refer to abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate.

Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines.

Processor virtualization may be implemented by the hypervisor scheduling time slots on one or more physical processors for a virtual machine, rather than a virtual machine actually having a dedicated physical processor. Memory virtualization may be implemented by employing a page table (PT) which is a memory structure translating virtual memory addresses to physical memory addresses. Device and input/output (I/O) virtualization involves managing the routing of I/O requests between virtual devices and the shared physical hardware.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
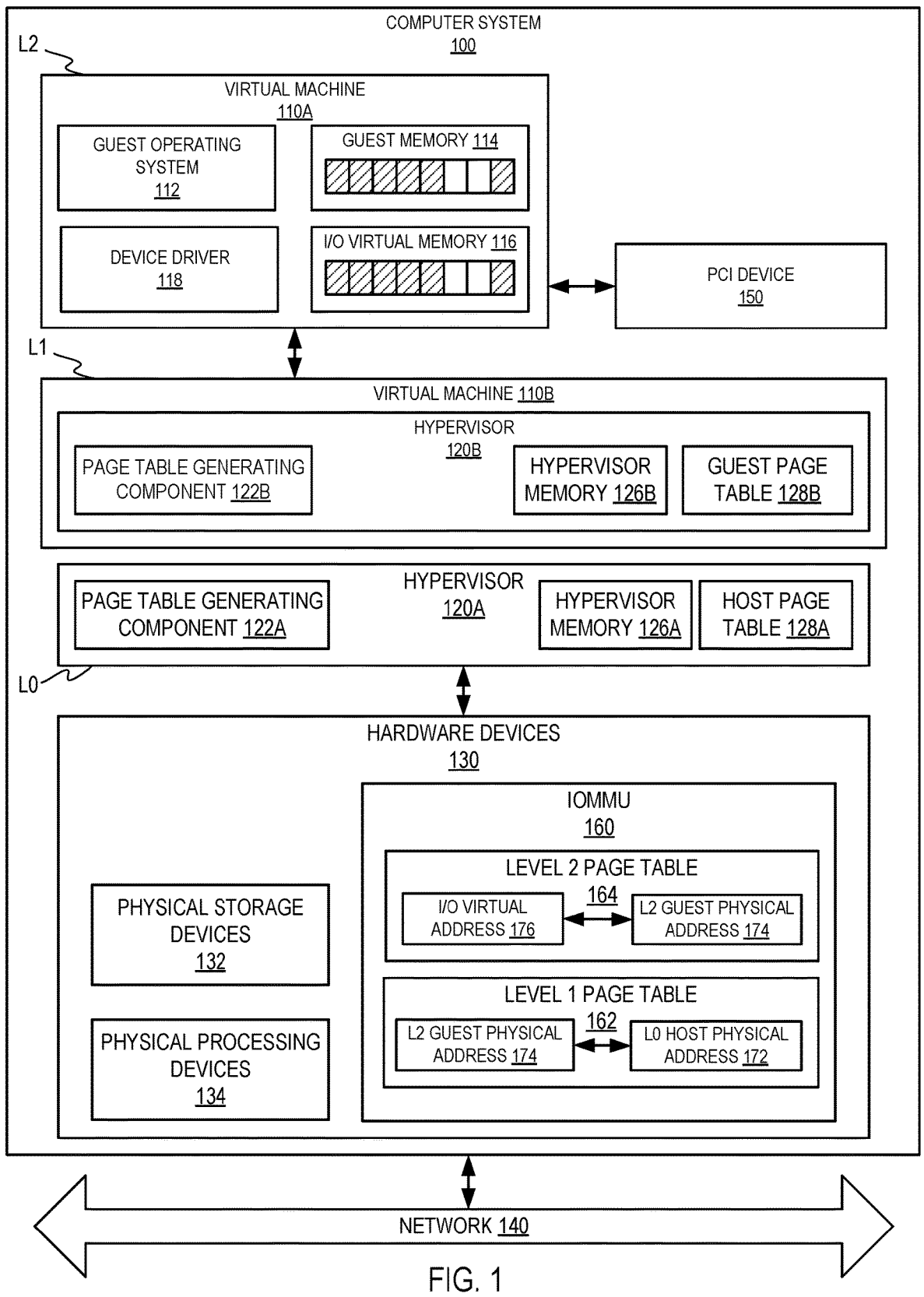
FIG. 1 depicts a high-level block diagram of an example host computer system that performs memory management for nested virtual machines, in accordance with one or more aspects of the present disclosure.

Described herein are systems and methods for improving memory access handling for nested virtual machines.

An input/output memory management unit (IOMMU) is a hardware device that resides on the input/output (I/O) path connecting a peripheral device to the memory. The IOMMU may map the device address space (e.g., a bus address) that is relevant to the I/O bus into the physical address space (e.g., host physical address) that is relevant to the memory bus. The IOMMU may include an IOMMU page table, which includes a set of page table entries, such that each page table entry translates a device-visible memory address to a host physical address of the host memory. The IOMMU may also include extra information associated with the address space mapping such as read and write permissions.

Nested virtualization refers to virtualization that runs inside an already virtualized environment. In nested virtualization, a first hypervisor (hereafter "Level 0 hypervisor") controls physical hardware resources (e.g., bare metal). One or more second hypervisors (hereafter "Level 1 hypervisor") may run as virtual machine(s) managed by the Level 0 hypervisor. Each Level 1 hypervisor may run its own set of VMs. These VMs can be referred to as Level 2 VMs. Each level corresponds to a level of privilege and access to computing resources of a computer system, where Level 0 indicates a most privileged level within an architecture of the computer system, and incremental levels indicate less privileged rings (e.g., Level 2 is less privileged that Level 1). The Level 1 hypervisor may control execution of the Level 2 VM(s). For example, the Level 1 hypervisor may implement a firewall in software and prevent the Level 2 VM from communicating outside the Level 1 hypervisor.

In some instances, a nested guest (e.g., Level 2 VM) may be assigned a Peripheral Component Interconnect (PCI) device. A PCI device is an external computer hardware device that connects to a computer system. In some instances, the PCI device may be coupled to a physical bus of the host machine. In some instances, the hypervisor may abstract the PCI device by assigning particular port ranges of the PCI device to the VM and presenting the assigned port ranges to the VM as a virtual device. The PCI device may be capable of direct memory access (DMA). DMA allows the PCI device to access the system memory for reading and/or writing independently of the central processing unit (CPU). PCI devices that are capable of performing DMA include disk drive controllers, graphics cards, network interface cards (NICs), sound cards, or any other input/output (I/O) device. While the hardware device is performing the DMA, the CPU can engage in other operations.

To protect itself from a malicious or faulty PCI device, the Level 2 VM may communicate, to the Level 1 hypervisor, the Level 2 guest physical addresses made accessible to the PCI device. The Level 1 hypervisor may then map, in an IOMMU, the Level 2 guest physical addresses to its guest physical addresses. In some instances, the IOMMU may include two levels of page tables. A first level page table may store a mapping of addresses of the guest physical memory of the Level 1 hypervisor to the addresses of the host physical memory of the Level 0 hypervisor memory. A second level page table may store a mapping of addresses of the I/O virtual addresses (assigned to the PCI device) to Level 2 guest physical addresses of the Level 2 VM, which are in turn mapped addresses of the guest physical memory of the Level 1 hypervisor. The Level 0 hypervisor may then grant the Level 1 hypervisor access to the second level page table to perform address translations.

However, during operation, the Level 2 VM may adjust the PCI device's accessibility to its guest memory pages, thus modifying to which guest memory pages the PCI device is allowed access. Accordingly, the Level 2 VM may need to perform an interrupt and temporarily exit to the Level 1 hypervisor (e.g., by a VMExit event) to request that the Level 1 hypervisor update the page table entries in the second level page table. This process causes the Level 2 VM to pause its processing threads, use additional processing resources (e.g., central processing unit (CPU) resources), and hinders performance of the Level 2 VM.

Aspects of the present disclosure address the above and other deficiencies by providing technology that can improve memory access handling in nested virtual machines. In particular, aspects of the present disclosure provide a shadow page table configuration which effectively allows the Level 2 VM to directly access the second level page table of an IOMMU. In an illustrative example, a host computer system can run a Level 0 hypervisor managing a Level 1 virtual machine running a Level 1 hypervisor. The Level 1 hypervisor may manage a Level 2 VM. The Level 0 hypervisor may manage a host page table and use the host page table to store a mapping of addresses of the guest physical memory of the Level 1 hypervisor memory to the addresses of the host physical memory of the Level 0 hypervisor memory. Similarly, the Level 1 hypervisor may manage a guest page table and use the guest page table to store a mapping of addresses of the guest physical memory of the Level 2 virtual machine memory to the addresses of the guest physical memory of the Level 1 hypervisor memory.

The Level 2 VM may be assigned a PCI device. The Level 2 VM may assign an input/output (I/O) virtual address space to be used by the PCI device. In response to detecting the PCI device or a request from the Level 2 VM, the Level 1 hypervisor may send (e.g., expose) the guest page table to the Level 0 hypervisor and request the Level 0 hypervisor to generate a shadow page table by combining the host page table with the guest page table. Specifically, Level 0 hypervisor may translate the Level 2 guest physical memory to the Level 0 host physical memory by combining the records (e.g., page table entries) of the host page table and the guest page table. Thus, Level 1 page table may be a shadow page table having compressed translations that are stored as a second level page table in an IOMMU. The Level 0 hypervisor may direct a CPU (or vCPU of the Level 1 hypervisor) to the Level 1 page table for memory page mappings during a first level translation (e.g., translate Level 2 guest physical addresses to Level 0 host physical addresses) and cause the CPU to use the Level 1 page table for address translations.

The Level 2 page table may include multiple records for Level 2 translations, where each record translates the I/O virtual addresses (assigned to the PCI device) to Level 2 guest physical addresses using a translation table. The Level 2 VM may direct its vCPU to the Level 2 page table, and cause the vCPU to use the Level 2 page table for address translation. The Level 0 hypervisor may further grant the Level 2 VM direct access to the Level 2 page table for second level translations. Thus, by way of the IOMMU page tables (the first level page table and the second level page table), the computer system may translate the I/O virtual addresses to Level 0 host physical addresses. Since the Level 2 VM has direct access to the Level 2 page table, the Level 2 VM may update its page table entries without triggering an interrupt and exiting to Level 1 hypervisor. Further, since the Level 2 VM does not have access to the shadow page table (the first level page table), the memory pages of the Level 2 virtual machine are protected. Accordingly, aspects of the present disclosure protect nested virtualization systems from malicious or faulty PCI device while reducing resource costs associated with a two-level IOMMU, thus enhancing the security and performance of the computer system.

Various aspects of the above referenced methods and systems are described in details herein below by way of examples, rather than by way of limitation. The examples provided below discuss a virtualized computer system where memory management may be initiated by aspects of a hypervisor, a host operating system, a virtual machine, or a combination thereof. In other examples, the memory movement may be performed in a non-virtualized computer system that is absent a hypervisor or other virtualization features discussed below.

FIG. 1 depicts an illustrative architecture of elements of a computer system 100, in accordance with an embodiment of the present disclosure. It should be noted that other architectures for computer system 100 are possible, and that the implementation of a computing device utilizing embodiments of the disclosure are not necessarily limited to the specific architecture depicted. Computer system 100 may be a single host machine or multiple host machines arranged in a cluster and may include a rackmount server, a workstation, a desktop computer, a notebook computer, a tablet computer, a mobile phone, a palm-sized computing device, a personal digital assistant (PDA), etc. In one example, computer system 100 may be a computing device implemented with x86 hardware. In another example, computer system 100 may be a computing device implemented with PowerPC®, SPARC®, or other hardware. In the example shown in FIG. 1, computer system 100 may include virtual machines 110A-B, hypervisors 120A-B, hardware devices 130, a network 140, and a Peripheral Component Interconnect (PCI) device 150.

Virtual machines 110A-B may execute guest executable code that uses an underlying emulation of the physical resources. The guest executable code may include a guest operating system, guest applications, guest device drivers, etc. Each of the virtual machines 110A-B may support hardware emulation, full virtualization, para-virtualization, operating system-level virtualization, or a combination thereof. Virtual machine 110A may have the same or different types of guest operating systems, such as Microsoft®, Windows®, Linux®, Solaris®, etc. Virtual machine 110A may execute guest operating system 112 that manages guest memory 114 and I/O virtual memory 116. Virtual machine 110B may also execute a guest operating system that manages guest memory. Virtual machine 110B be the same or similar in all aspects to virtual machine 110A.

Guest memory 114 may be any virtual memory, logical memory, physical memory, other portion of memory, or a combination thereof for storing, organizing, or accessing data. Guest memory 114 may represent the portion of memory that is designated by hypervisor 120A for use by one or more respective virtual machines (e.g., virtual machine 110A). Guest memory 114 may be managed by guest operating system 112 and may be segmented into guest pages. The guest pages may each include a contiguous or non-contiguous sequence of bytes or bits and may have a page size that is the same or different from a memory page size used by hypervisor 120A. Each of the guest page sizes may be a fixed-size, such as a particular integer value (e.g., 4KB, 2MB) or may be a variable-size that varies within a range of integer values.

I/O virtual memory 116 may be a virtual address space created by device driver 114 for use by PCI device 150. Device driver 114 may be any type of virtual or physical device driver, such as, for example, a vCPU driver. In an example, device driver 114 may be utilized for creating I/O virtual memory 116. In another example, device driver 114 may be utilized for communicating with IOMMU 160 and generating records in Level 2 page table 164 of IOMMU 160, where each record maps an I/O virtual address 176 of the I/O virtual memory 116 to a L2 guest physical address 174 of guest memory 114. The features provided by device driver 114 may be integrated into the operations performed by guest operating system 112. The features of device driver 114 are discussed in more detail below.

Hypervisor memory 126A (e.g., host memory) and hypervisor memory 126B (e.g., guest memory) may be the same or similar to the guest memory but may be managed by hypervisor 120A-B, respectively, instead of a guest operating system. Hypervisor memory 126A may be segmented into host pages, and hypervisor memory 126B may be segmented into guest pages, which may be in different states. The states may correspond to unallocated memory, memory allocated to guests, and memory allocated to hypervisor(s). The unallocated memory may be host memory pages and guest memory pages that have not yet been allocated by hypervisor memory 126A-B or were previously allocated by hypervisor 120A-B and have since been deallocated (e.g., freed) by hypervisor 120A-B. The memory allocated to guests may be a portion of hypervisor memory 126A that has been allocated by hypervisor 120A to virtual machine 110B and corresponds to guest memory of virtual machine 114B, and to guest memory of hypervisor 120B, which is running on virtual machine 110B. Hypervisor 120B may allocate a portion of hypervisor memory 126B to virtual machine 110A, which corresponds to guest memory 114A. Other portions of hypervisor memory may be allocated for use by hypervisor 120A-B, a host operating system, hardware device, other module, or a combination thereof.

Hypervisor 120A and may provide hypervisor 120B and virtual machines 110A with access to one or more features of the underlying hardware devices 130. Hypervisor 120A may be a Level 0 hypervisor, thus having the highest level of privilege within the computer system 100. In the example shown, hypervisor 120A may run directly on the hardware of computer system 100 (e.g., bare metal hypervisor). In other examples, hypervisor 120A may run on or within a host operating system (not shown). Hypervisor 120A may manage system resources, including access to hardware devices 130. In the example shown, hypervisor 120A may include a page table generating component 122A.

Page table generating component 122A may generate host page table 128A. A page table is a data structure used by a hypervisor to store a mapping of addresses of guest memory to addresses of hypervisor memory. In an example, hypervisor 120A may use the host page table 128A to store a mapping of addresses of the guest memory and of hypervisor memory 126B to addresses of the hypervisor memory 126A. Accordingly, address translation is handled using the page table(s). Host page table 128A may include one or more page tables such as a protected host page table or an unprotected host page table. In an example, host page table 128A may be an extended page table ("EPT"), translating guest physical addresses to host physical addresses (e.g., Level 1 guest physical addresses to Level 0 host physical addresses). In another example, host page table 128A may be a shadow page table translating the guest virtual addresses to host physical addresses (e.g., Level 1 guest virtual addresses to Level 0 host physical addresses).

Guest page table 128B may be the same or similar to the host page table 128A but may be managed by hypervisor 120B, instead of hypervisor 120A. In an example, hypervisor 120B may use the guest page table 128B to store a mapping of addresses of the guest memory 114A to addresses of the hypervisor memory 126B. Accordingly, address translation is handled using the page table(s). Guest page table 128B may include one or more page tables such as a protected host page table or an unprotected host page table. In an example, guest page table 128B may be an extended page table ("EPT"), translating guest physical addresses to hypervisor physical addresses (e.g., Level 2 guest physical addresses to Level 1 guest physical addresses). In another example, guest page table 128B may be a shadow page table translating the Level 2 guest virtual addresses to Level 1 guest physical addresses.

Hypervisor 120B and may provide virtual machines 110A with access to one or more features of the underlying hardware devices 130. Hypervisor 120B may be a level 1 (Level 1) hypervisor, thus having a lower privilege than hypervisor 120A. In the example shown, hypervisor 120B may run on or within a virtual machine 110B running on hypervisor 120A. Hypervisor 120B may manage system resources provided to hypervisor 120B by virtual machine 110B or by hypervisor 120A. In the example shown, hypervisor 120B may include a page table generating component 122B. Page table generating component 122B may be similar or the same as page generating component 122A, and may generate guest page table 128B.

Hardware devices 130 may provide hardware resources and functionality for performing computing tasks. Hardware devices 130 may include one or more physical storage devices 132, one or more physical processing devices 134, other computing devices, or a combination thereof. One or more of hardware devices 130 may be split up into multiple separate devices or consolidated into one or more hardware devices. Some of the hardware device shown may be absent from hardware devices 130 and may instead be partially or completely emulated by executable code.

Physical storage devices 132 may include any data storage device that is capable of storing digital data and may include volatile or non-volatile data storage. Volatile data storage (e.g., non-persistent storage) may store data for any duration of time but may lose the data after a power cycle or loss of power. Non-volatile data storage (e.g., persistent storage) may store data for any duration of time and may retain the data beyond a power cycle or loss of power. In one example, physical storage devices 132 may be physical memory and may include volatile memory devices (e.g., random access memory (RAM)), non-volatile memory devices (e.g., flash memory, NVRAM), and/or other types of memory devices. In another example, physical storage devices 132 may include one or more mass storage devices, such as hard drives, solid state drives (SSD)), other data storage devices, or a combination thereof. In a further example, physical storage devices 132 may include a combination of one or more memory devices, one or more mass storage devices, other data storage devices, or a combination thereof, which may or may not be arranged in a cache hierarchy with multiple levels.

Physical processing devices 134 may include one or more processors that are capable of executing the computing tasks. Physical processing devices 134 may be a single core processor that is capable of executing one instruction at a time (e.g., single pipeline of instructions) or may be a multi-core processor that simultaneously executes multiple instructions. The instructions may encode arithmetic, logical, or I/O operations. In one example, physical processing devices 134 may be implemented as a single integrated circuit, two or more integrated circuits, or may be a component of a multi-chip module (e.g., in which individual microprocessor dies are included in a single integrated circuit package and hence share a single socket). A physical processing device may also be referred to as a central processing unit ("CPU").

IOMMU 160 may manage address translations in response to receiving memory access requests, interrupt requests, or any other data requests and/or commands. IOMMU 160 may include Level 1 page table 162 and Level 2 page table 164. Level 1 page table 162 may be a data structure used to store a mapping of addresses of the guest memory (e.g., hypervisor memory 126B) to addresses of the host memory (e.g., hypervisor memory 126A). Level 2 page table 164 may be a data structure used to store a mapping of addresses of the I/O memory to addresses of the guest memory (e.g., hypervisor memory 126B). Accordingly, address translation is handled using the page tables 162, 164.

Page table 162, 164 may include one or more page tables such as a protected page table or an unprotected page table. In an example, page table 162, 164 may be an extended page table (EPT) translating guest physical addresses to host physical addresses. In another example, page table 162, 164 may be a shadow page table translating the guest virtual addresses to host physical addresses. In another example, page table 162, 164 may be a hypervisor page table, translating the guest physical addresses to hypervisor virtual addresses.

In an example, Level 1 page table 162 may translate guest physical addresses 174 of guest memory 114 pages to host physical addresses 172 of hypervisor memory 126A. Level 2 page table 164 may translate I/O virtual addresses 176 of I/O virtual memory 116 pages to Level 2 guest physical addresses 174 of guest memory 114 pages.

Hypervisor 120A may generate the Level 1 page table 162 by combining entries from host page table 128 and entries from guest page table 128B. This will be explained in greater detail below. Hypervisor 120A may enable virtual machine 110A (via device driver 118) to access the Level 2 page table 164 directly, without an interrupt request (e.g., without causing virtual machine 110A to temporarily exit to the hypervisor 120B (e.g., by a VMExit event) and be subsequently restarted (e.g., by a VMEnter or VMResume instruction)). Thus, virtual machine 110A can make create, modify, or erase records associated with Level 2 page table 164. Translation of the Level 1 page table 162 can restricted, and performed by hypervisor 120A. In some embodiments, Hypervisor 120A or hypervisor 120B may set up, create, access, modify, and/or erase records associated with Level 2 page table 164.

In some embodiments, IOMMU 160 may be a virtual device. For example, hypervisor 120A may create a virtual device having an IOMMU and expose the virtual device to the virtual machines via an appropriate virtual device driver. The virtual device may have no associated hardware, and the IOMMU functionality may be implemented by a hypervisor module that communicates with the virtual device driver.

In some embodiments, IOMMU 160 may include three or more level of translations, and include a corresponding amount of page table (e.g., if supporting three levels of translations, IOMMU 160 may include a Level 1 page table, a Level 2 page table, and a Level 3 page table).

PCI device 150 may be a computer hardware device that plugs directly into a PCI slot of the computer system 100. PCI device 150 may be assigned to the guest operation system 112 of the virtual machine 110 and may communicate with the guest operation system 112. PCI device 150 may include DMA (direct memory access) capabilities, which allow PCI device 150 to access system memory (e.g., physical storage devices 132) for reading and/or writing independently of a system CPU (e.g., physical processing devices 134). For example, the PCI device 150 may transfer its input/output (I/O) data directly to and from physical storage devices 132. PCI device 150 may be assigned to the PCI device to operate in a virtual address space of I/O virtual memory 116A.

Network 140 may be a public network (e.g., the internet), a private network (e.g., a local area network (LAN), a wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

Figure 2:
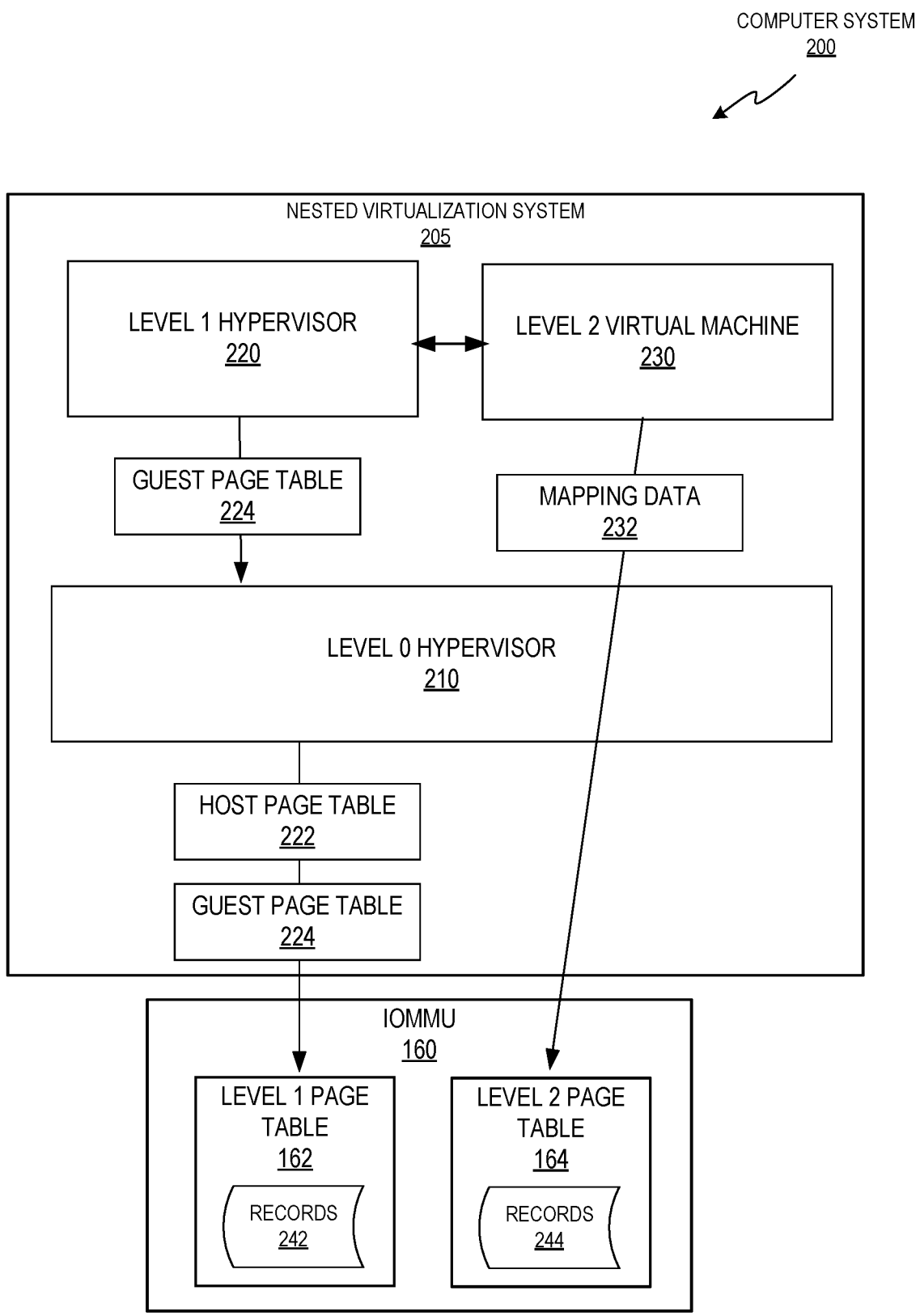
FIG. 2 depicts a block diagram illustrating components and modules of an example computer system, in accordance with one or more aspects of the present disclosure.

FIG. 2 is a block diagram illustrating example components and modules of computer system 200, in accordance with one or more aspects of the present disclosure. Computer system 200 may comprise executable code that implements one or more of the components and modules and may be implemented within a hypervisor, a host operating system, a guest operating system, hardware firmware, or a combination thereof. In the example shown, computer system 200 may include nested virtualization system 205 and IOMMU 160.

Nested virtualization system 205 may include Level 0 hypervisor 210, which may manage a Level 1 virtual machine running Level 1 hypervisor 220. Level 1 hypervisor 220 may manage Level 2 virtual machine 230. Level 0 hypervisor 210 may manage host page table 222 and use host page table 222 to store a mapping of addresses of the guest physical memory of the Level 1 hypervisor memory to the addresses of the host physical memory of the Level 0 hypervisor memory. Level 1 hypervisor 220 may manage guest page table 224 and use guest page table 224 to store a mapping of addresses of the guest physical memory of the Level 2 virtual machine memory to the addresses of the guest physical memory of the Level 1 hypervisor memory.

Level 2 virtual machine 230 may be assigned (for example, by Level 0 hypervisor 210 or Level 1 hypervisor 220) a PCI device (not shown). The PCI device may be similar or the same as PCI device 150 of FIG. 1. In response to detecting the PCI device or a request from the Level 2 virtual machine, the Level 1 hypervisor 220 may send (e.g., expose) the guest page table 224 to the Level 0 hypervisor 210 and request the Level 0 hypervisor 210 to generate a shadow page table (e.g., Level 1 page table 162) by combining the host page table 222 with the guest page table 224. Specifically, Level 0 hypervisor 210 (via, for example, the page table generating component 122A), may first analyze the guest page table 224. Level 0 hypervisor 210 may then translate Level 2 guest physical memory to Level 0 host physical memory by combining the records (e.g., page table entries) of the host page table 222 and the guest page table 224. Thus, Level 1 page table 162 may be a shadow page table having compressed translations that are stored in memory as records 242. Accordingly, the Level 0 hypervisor or Level 1 hypervisor may direct a CPU or vCPU to Level 1 page table 162 for memory page mappings during a first level translation (e.g., translate Level 2 guest physical addresses to Level 0 host physical addresses) and cause the CPU or vCPU to use Level 1 page table 162 for address translations.

Figure 3:
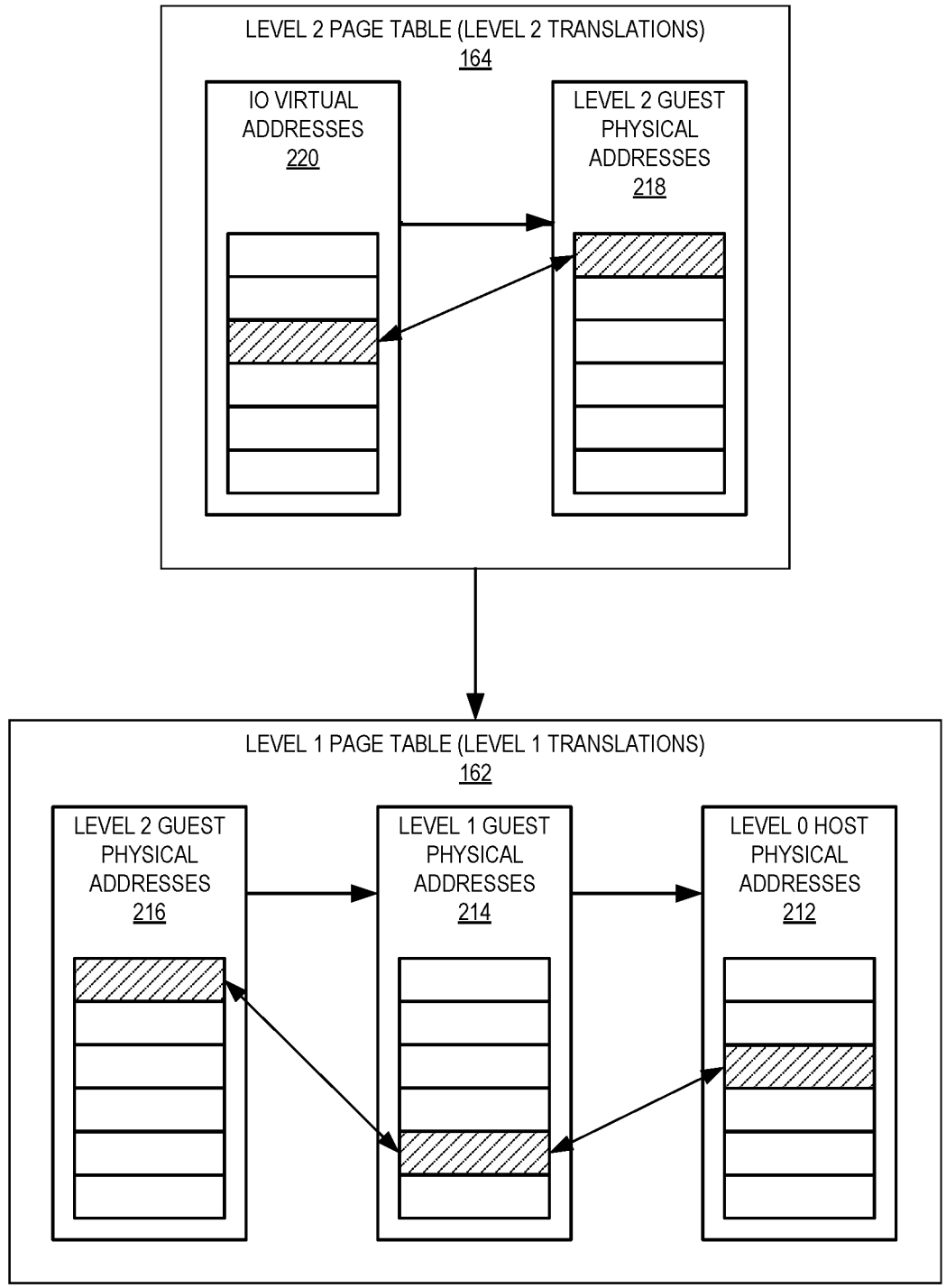
FIG. 3 depicts a block diagram illustrating an example memory translation, in accordance with one or more aspects of the present disclosure.

Level 0 hypervisor 210 may further grant the Level 2 virtual machine direct access to the Level 2 page table 164 for second level translations. In an example, the Level 2 page table 164 may include records 244, where each record within records 244 translates the I/O virtual addresses (assigned to the PCI device) to Level 2 guest physical addresses using a translation table. The Level 2 virtual machine may direct its vCPU Level 2 page table 164, and cause the vCPU to use Level 2 page table 164 for address translation. Thus, by way of page tables 162, 164, the computer system 200 may translate the I/O virtual addresses to Level 0 host physical addresses. This can be seen in FIG. 3, which is block diagram showing translations performed in page tables 162, 164. Specifically, FIG. 3 shows Level 2 page table 164 having I/O virtual addresses 220 mapped to Level 2 guest physical addresses 218. FIG. 3 further shows Level 1 page table 162 having Level 2 guest physical addresses 216 mapped to Level 1 guest physical addresses 214, which are in turn mapped to Level 0 host physical addresses 212. Accordingly, page table 162, 164 can be used to translate I/O virtual addresses to Level 0 host physical addresses.

By way of illustrative example, the PCI device assigned to the Level 2 virtual machine may request to access data on a memory page(s). In response, a vCPU scheduler of the Level 2 virtual machine may schedule the request for execution on a vCPU. The Level 2 virtual machine may direct the vCPU to the Level 2 page table 164 for memory page mappings during a second level translation and cause the vCPU to use the Level 2 page table to translate I/O virtual addresses to Level 2 guest physical addresses. The Level 0 hypervisor may then direct a host CPU to the Level 1 page table 162 for memory mappings during a first level translation and cause the host CPU to use Level 1 page table 162 to translate Level 2 guest physical addresses to Level 0 host physical addresses.

Returning to FIG. 2, Level 2 virtual machine 230 adjust the PCI device's accessibility to its guest memory pages (add access to certain guest memory pages, remove access to certain guest memory pages, etc.), thus modifying to which guest memory pages the PCI device is allowed access (for security reasons, such as to limit the PCI device's access to certain data, for remapping reasons, etc.). Since the Level 2 virtual machine 230 has direct access to Level 2 page table 164, Level 2 virtual machine 230 may update the records 244 without triggering an interrupt and exiting to Level 1 hypervisor. To update the records 244, Level 2 virtual machine 230 may send mapping data 232 to Level 2 page table 164. Mapping data 232 may include new or update records that translates the I/O virtual addresses to the Level 2 guest physical addresses.

The embodiments of the present disclosure can be applied to additional nested layers. For example, in a computer system with five levels (e.g., Level 0 hypervisor and Levels 1-4 guests), layer 0-3 may be shadowed and mapped to the Level 1 page table, while level four may be mapped to the Level 4 guest.

In some embodiments, the IOMMU may include three or more levels of translations. Accordingly, more than one of the levels of translations may be associated a shadow page table. For example, in an illustrative example where the IOM MU includes three level of translations and a nested virtualization system includes five levels (e.g., Level 0 hypervisor and Levels 1-4 guests), a PCI device may be associated with the Level 2 guest. Accordingly, the IOMMU may include a Level 1 shadow page table (translating Level 2 guest physical addresses to Level 0 host physical addresses), a Level 2 page table (translating Level 2 I/O virtual addresses to Level 2 guest physical addresses), and a Level 3 page table (translating Level 2 guest physical addresses to Level 4 guest physical addresses).

Figure 4:
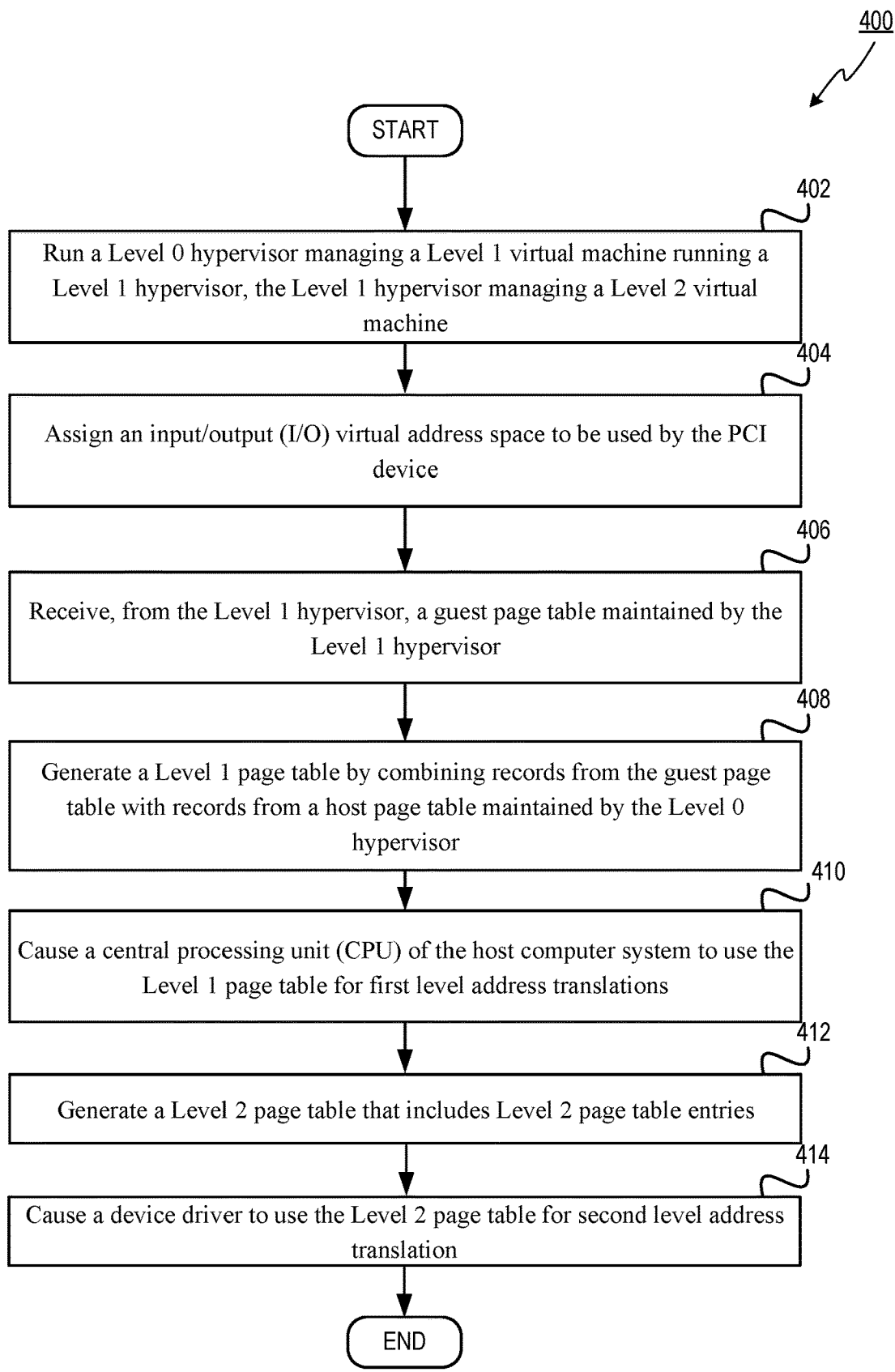
FIG. 4 depicts a flow diagram of an example method for memory management for nested virtual machines, in accordance with one or more aspects of the present disclosure.

FIG. 4 depicts a flow diagram of an illustrative example of a method 400 for memory management for nested virtual machines, in accordance with one or more aspects of the present disclosure. Method 400 and each of its individual functions, routines, subroutines, or operations may be performed by one or more processors of the computer device executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processes implementing method 400 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by a kernel of a hypervisor as shown in FIG. 1 or by an executable code of a host machine (e.g., host operating system or firmware), a virtual machine (e.g., guest operating system or virtual firmware), other executable code, or a combination thereof.

Method 400 may be performed by processing devices of a server device or a client device and may begin at block 402. At block 402, a host computer system may run a Level 0 hypervisor managing a Level 1 virtual machine running a Level 1 hypervisor. The Level 1 hypervisor may manage a Level 2 virtual machine. The Level 2 virtual machine may be assigned a Peripheral Component Interconnect (PCI) device.

At block 404, the Level 2 virtual machine may assign an input/output (I/O) virtual address space to be used by the PCI device. In other embodiments, the Level 0 hypervisor or the Level 1 hypervisor may assign the I/O address space to be used by the PCI device.

At block 406, the Level 0 hypervisor may receive, from the Level 1 hypervisor, a guest page table maintained by the Level 1 hypervisor.

At block 408, the Level 0 hypervisor may generate a Level 1 page table by combining records from the guest page table with records from a host page table maintained by the Level 0 hypervisor. The Level 1 page table may include page table records. Each Level 1 table record of the plurality of Level 1 page table records maps a Level 2 guest physical address of a Level 2 address space associated with the Level 2 virtual machine to a corresponding Level 0 host physical address of a Level 0 address space associated with the Level 0 hypervisor.

At block 410, the Level 0 hypervisor may cause a central processing unit (CPU) of the host computer system to use the Level 1 page table for first level address translations. In some embodiments, the Level 0 hypervisor may grant to the Level 1 hypervisor, direct access to the Level 1 page table.

At block 412, the Level 0 hypervisor may generate a Level 2 page table that includes Level 2 page table entries. Each Level 2 page table entry of the plurality of Level 2 page table entries may map a I/O guest virtual address of the I/O virtual address space to a corresponding Level 2 guest physical address. In some embodiments, the Level 1 page table and the Level 2 page table are part of an IOMMU.

At block 414, the Level 2 virtual machine may cause a device driver to use the Level 2 page table for second level address translation. In some embodiments, the Level 2 virtual machine may update a page table entry of the Level 2 page table. For example, the update be performed responsive to removing access, of the PCI device, to a virtual machine memory page. In some embodiments, the Level 2 virtual machine may receive a request from the PCI device to access data on a memory page of the plurality of memory pages and cause a vCPU of the Level 2 virtual machine to use the Level 2 page table for address translation. Responsive to completing the operations described herein above with references to block 414, the method may terminate.

Figure 5:
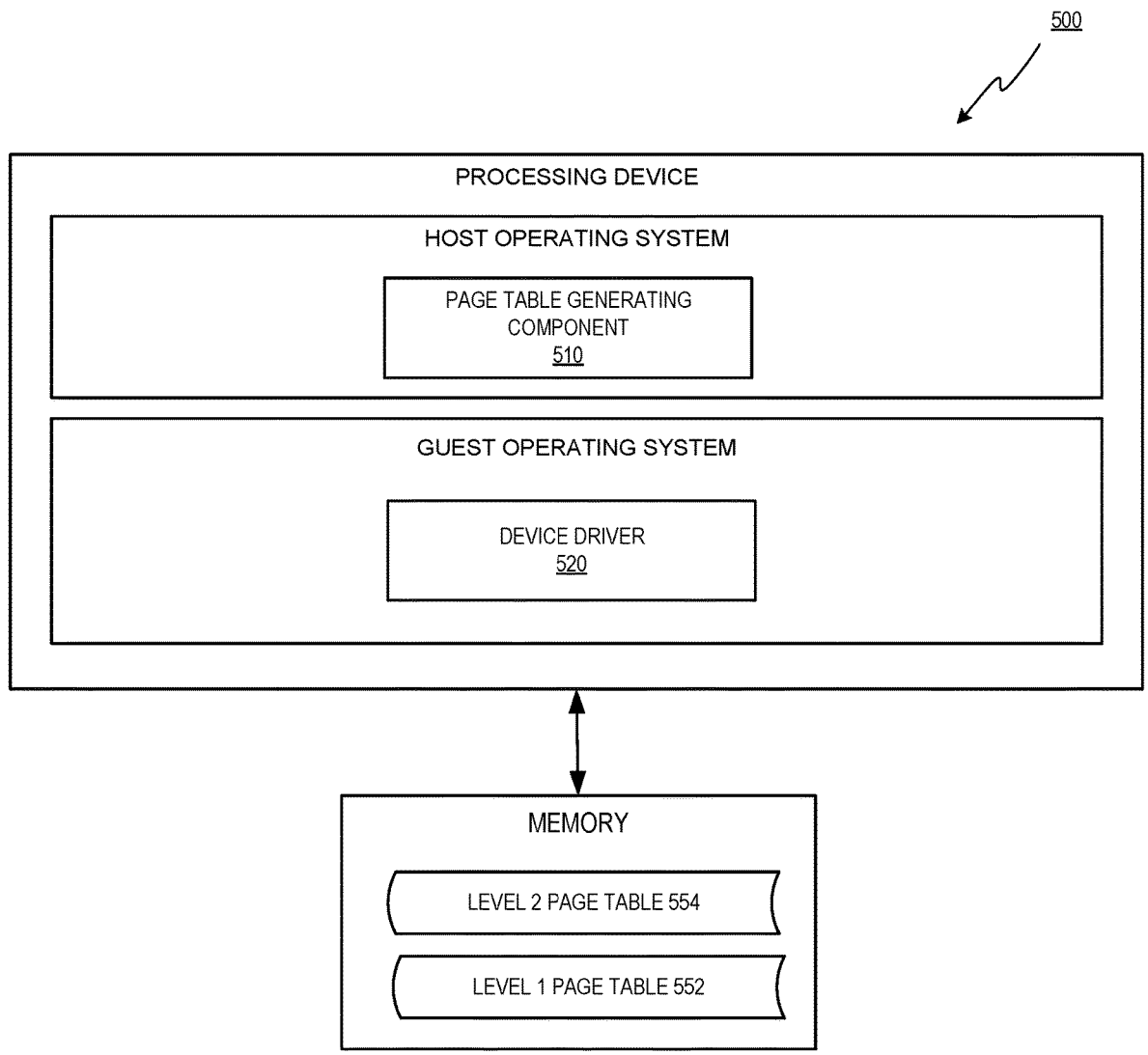
FIG. 5 depicts a block diagram of an example computer system in accordance with one or more aspects of the present disclosure.

FIG. 5 depicts a block diagram of a computer system 500 operating in accordance with one or more aspects of the present disclosure. Computer system 500 may be the same or similar to computer system 200 and computing device 100 and may include one or more processing devices and one or more memory devices. In the example shown, computer system 500 may include a page table generating component 510, device driver 520, a Level 1 page table 552, and a Level 2 page table 554.

A processing device may run a Level 0 hypervisor managing a Level 1 virtual machine running a Level 1 hypervisor. The Level 1 hypervisor may manage a Level 2 virtual machine. The Level 2 virtual machine may be assigned a Peripheral Component Interconnect (PCI) device.

Page table generating component 510 may receive, from the Level 1 hypervisor, a guest page table maintained by the Level 1 hypervisor and generate a Level 1 page table 552 by combining records from the guest page table with records from a host page table maintained by the Level 0 hypervisor. The Level 1 page table 552 may include page table records. Each Level 1 table record of the plurality of Level 1 page table records maps a Level 2 guest physical address of a Level 2 address space associated with the Level 2 virtual machine to a corresponding Level 0 host physical address of a Level 0 address space associated with the Level 0 hypervisor. The page table generating component 510 may cause a central processing unit (CPU) of the host computer system to use the Level 1 page table for first level address translations. In some embodiments, the Level 0 hypervisor may grant to the Level 1 hypervisor, direct access to the Level 1 page table.

Page table generating component 510 or the device driver 520 may generate a Level 2 page table 554 that includes Level 2 page table entries. Each Level 2 page table entry of the plurality of Level 2 page table entries may map a I/O guest virtual address of the I/O virtual address space to a corresponding Level 2 guest physical address. In some embodiments, the Level 1 page table and the Level 2 page table are part of an IOMMU.

The device driver 520 may assign an input/output (I/O) virtual address space to be used by the PCI device. The device driver 520 may cause the Level 2 virtual machine to use the Level 2 page table for second level address translation. In some embodiments, the Level 2 virtual machine may update a page table entry of the Level 2 page table 554. For example, the update be performed responsive to removing access, of the PCI device, to a virtual machine memory page. In some embodiments, the Level 2 virtual machine may receive a request from the PCI device to access data on a memory page of the plurality of memory pages and cause a vCPU of the Level 2 virtual machine to use the Level 2 page table for address translation.

Figure 6:
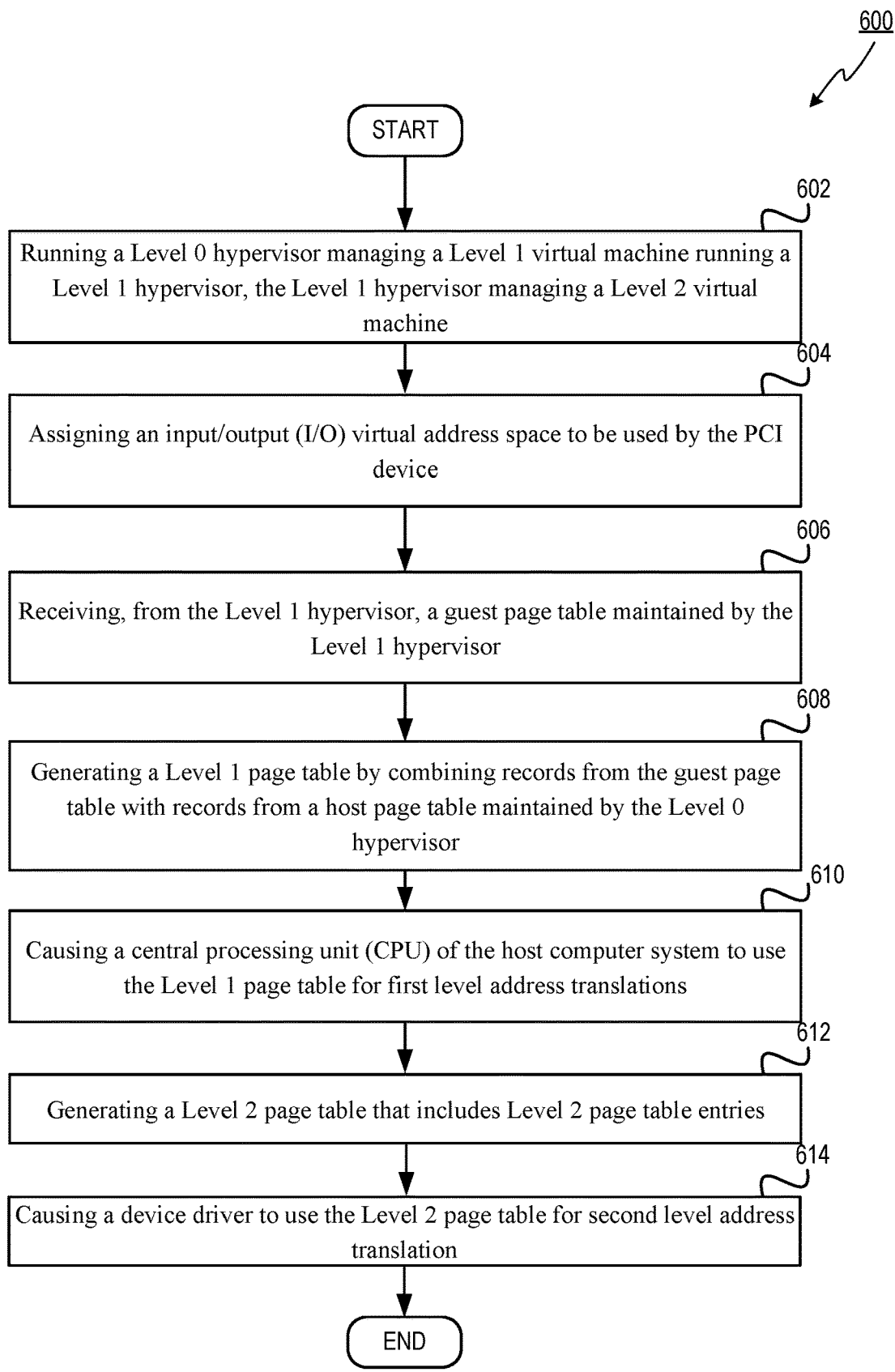
FIG. 6 depicts a flow diagram of an example method for memory management for nested virtual machines, in accordance with one or more aspects of the present disclosure.

FIG. 6 depicts a flow diagram of one illustrative example of a method 600 for virtualized memory management, in accordance with one or more aspects of the present disclosure. Method 600 may be similar to method 400 and may be performed in the same or a similar manner as described above in regards to method 400. Method 600 may be performed by processing devices of a server device or a client device and may begin at block 602.

At block 602, a processing device may run a Level 0 hypervisor managing a Level 1 virtual machine running a Level 1 hypervisor. The Level 1 hypervisor may manage a Level 2 virtual machine. The Level 2 virtual machine may be assigned a Peripheral Component Interconnect (PCI) device.

At block 604, the processing device may assign an input/output (I/O) virtual address space to be used by the PCI device. In some embodiments, the Level 0 hypervisor, the Level 1 hypervisor, or the Level 2 virtual machine may assign the I/O address space to be used by the PCI device.

At block 606, the processing device may receive, from the Level 1 hypervisor, a guest page table maintained by the Level 1 hypervisor.

At block 608, the processing device may generate a Level 1 page table by combining records from the guest page table with records from a host page table maintained by the Level 0 hypervisor. The Level 1 page table may include page table records. Each Level 1 table record of the plurality of Level 1 page table records maps a Level 2 guest physical address of a Level 2 address space associated with the Level 2 virtual machine to a corresponding Level 0 host physical address of a Level 0 address space associated with the Level 0 hypervisor.

At block 610, the processing device may cause a central processing unit (CPU) of the host computer system to use the Level 1 page table for first level address translations. In some embodiments, the Level 0 hypervisor may grant to the Level 1 hypervisor, direct access to the Level 1 page table.

At block 612, the processing device may generate a Level 2 page table that includes Level 2 page table entries. Each Level 2 page table entry of the plurality of Level 2 page table entries may map a I/O guest virtual address of the I/O virtual address space to a corresponding Level 2 guest physical address. In some embodiments, the Level 1 page table and the Level 2 page table are part of an IOMMU.

At block 614, the processing device may cause a device driver of the Level 2 virtual machine to use the Level 2 page table for second level address translation. In some embodiments, the Level 2 virtual machine may update a page table entry of the Level 2 page table. For example, the update be performed responsive to removing access, of the PCI device, to a virtual machine memory page. In some embodiments, the Level 2 virtual machine may receive a request from the PCI device to access data on a memory page of the plurality of memory pages and cause a vCPU of the Level 2 virtual machine to use the Level 2 page table for address translation. Responsive to completing the operations described herein above with references to block 614, the method may terminate.

Figure 7:
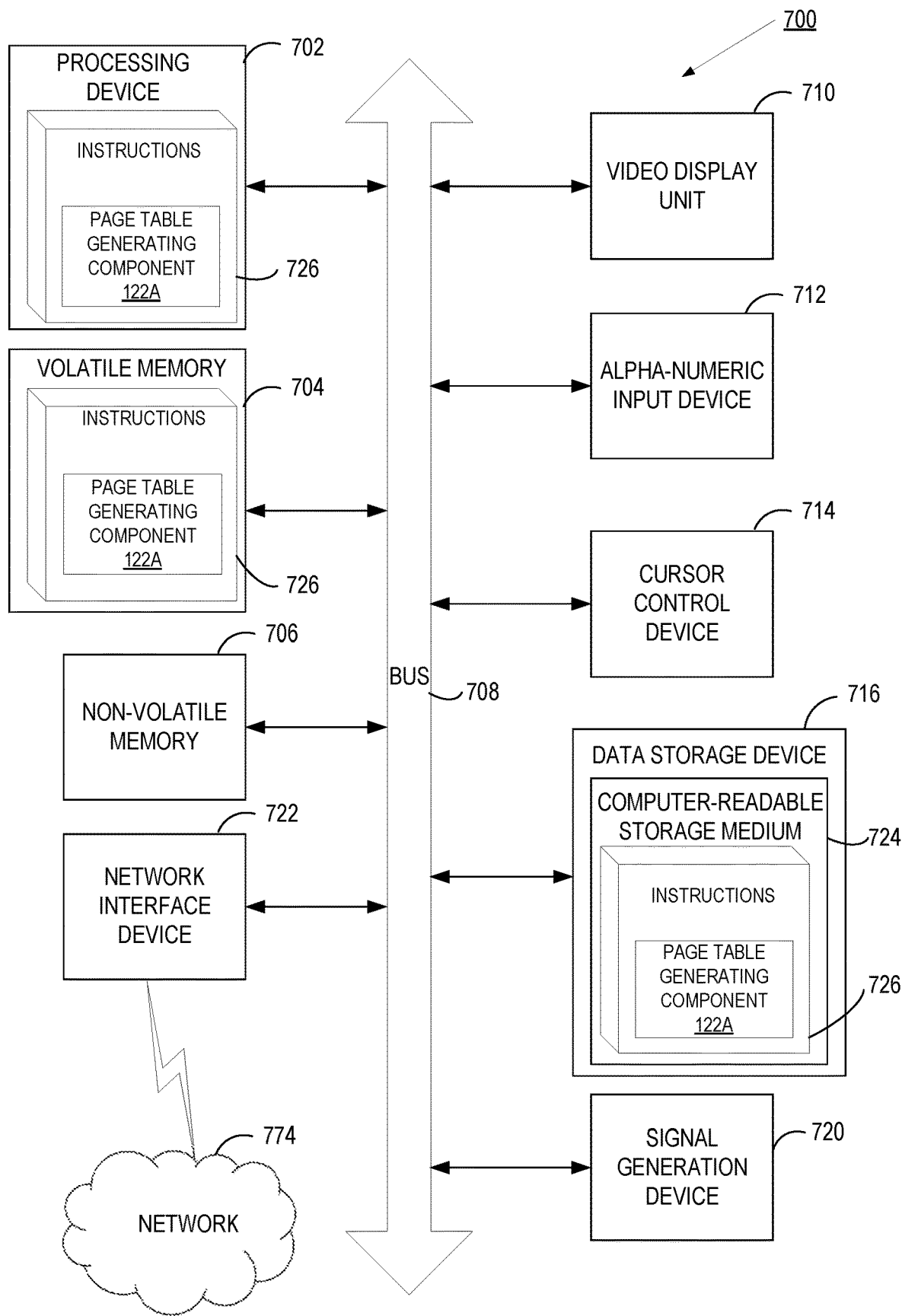
FIG. 7 depicts a block diagram of an illustrative computing device operating in accordance with the examples of the present disclosure.

FIG. 7 depicts a block diagram of a computer system operating in accordance with one or more aspects of the present disclosure. In various illustrative examples, computer system 700 may correspond to computing device 100 of FIG. 1 or computer system 200 of FIG. 2. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 700 may be connected (e.g., via a network, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 may include a processing device 702, a volatile memory 704 (e.g., random access memory (RAM)), a non-volatile memory 706 (e.g., read-only memory (ROM) or electrically-erasable programmable ROM (EEPROM)), and a data storage device 716, which may communicate with each other via a bus 708.

Processing device 702 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 700 may further include a network interface device 722. Computer system 600 also may include a video display unit 710 (e.g., an LCD), an alpha-numeric input device 712 (e.g., a keyboard), a cursor control device 714 (e.g., a mouse), and a signal generation device 720.

Data storage device 716 may include a non-transitory computer-readable storage medium 724 on which may store instructions 726 encoding any one or more of the methods or functions described herein, including instructions for implementing methods 400 or 600 and for page table generating component 122, encryption component 124 (not shown), and modules illustrated in FIGS. 1 and 2.

Instructions 726 may also reside, completely or partially, within volatile memory 704 and/or within processing device 702 during execution thereof by computer system 700, hence, volatile memory 704 and processing device 702 may also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 400 or 600 and one or more of its individual functions, routines, subroutines, or operations.

Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
running, by a host computer system, a Level 0 hypervisor managing a Level 1 virtual machine running a Level 1 hypervisor, wherein the Level 1 hypervisor manages a Level 2 virtual machine, wherein the Level 2 virtual machine is associated with a Peripheral Component Interconnect (PCI) device;
assigning an input/output (I/O) virtual address space to be used by the PCI device;
receiving, from the Level 1 hypervisor, a guest page table maintained by the Level 1 hypervisor;
generating, by the Level 0 hypervisor, a Level 1 page table by combining records from the guest page table with records from a host page table maintained by the Level 0 hypervisor;
causing a central processing unit (CPU) of the host computer system to use the Level 1 page table for first level address translations;
generating a Level 2 page table comprising a plurality of Level 2 page table entries, wherein each Level 2 page table entry of the plurality of Level 2 page table entries maps a I/O guest virtual address of the I/O virtual address space to a corresponding Level 2 guest physical address; and
causing a device driver of the Level 2 virtual machine to use the Level 2 page table for second level address translation.

2. The method of claim 1, further comprising:
granting, by the Level 0 hypervisor to the Level 2 virtual machine, direct access to the Level 2 page table.

3. The method of claim 1, wherein the Level 1 page table comprises a plurality of page table records, wherein each Level 1 page table record of the plurality of Level 1 page table records maps a Level 2 guest physical address of a Level 2 address space associated with the Level 2 virtual machine to a corresponding Level 0 host physical address of a Level 0 address space associated with the Level 0 hypervisor.

4. The method of claim 1, further comprising:
responsive to removing access, of the PCI device, to a memory page, updating, by the Level 2 virtual machine, a page table entry of the Level 2 page table.

5. The method of claim 1, further comprising:
receiving a request from the PCI device to access data on a memory page of a plurality of memory pages; and
causing a vCPU of the Level 2 virtual machine to use the Level 2 page table for address translation.

6. The method of claim 1, wherein the Level 1 page table and the Level 2 page table are part of an input/output memory management unit (IOMMU).

7. The method of claim 1, further comprising:
granting, by the Level 0 hypervisor to the Level 1 hypervisor, direct access to the Level 1 page table.

8. The method of claim 1, wherein the I/O virtual address space to be used by the PCI device is assigned by the Level 2 virtual machine.

9. A system, comprising:
a memory;
a processing device operatively coupled to the memory, the processing device configured to:
running a Level 0 hypervisor managing a Level 1 virtual machine running a Level 1 hypervisor, wherein the Level 1 hypervisor manages a Level 2 virtual machine, wherein the Level 2 virtual machine is associated with a Peripheral Component Interconnect (PCI) device;
assign an input/output (I/O) virtual address space to be used by the PCI device;
receive, from the Level 1 hypervisor, a guest page table maintained by the Level 1 hypervisor;
generate a Level 1 page table by combining records from the guest page table with records from a host page table maintained by the Level 0 hypervisor;
cause a central processing unit (CPU) of a host computer system to use the Level 1 page table for first level address translations;
generate a Level 2 page table comprising a plurality of Level 2 page table entries, wherein each Level 2 page table entry of the plurality of Level 2 page table entries maps a I/O guest virtual address of the I/O virtual address space to a corresponding Level 2 guest physical address; and
cause a device driver of the Level 2 virtual machine to use the Level 2 page table for second level address translation.

10. The system of claim 9, further comprising the processing device configured to:
grant, to the Level 2 virtual machine, direct access to the Level 2 page table.

11. The system of claim 9, wherein the Level 1 page table comprises a plurality of page table records, wherein each Level 1 page table record of the plurality of Level 1 page table records maps a Level 2 guest physical address of a Level 2 address space associated with the Level 2 virtual machine to a corresponding Level 0 host physical address of a Level 0 address space associated with the Level 0 hypervisor.

12. The system of claim 9, further comprising the processing device configured to:
responsive to removing access, of the PCI device, to a memory page, update, by the Level 2 virtual machine, a page table entry of the Level 2 page table.

13. The system of claim 9, further comprising the processing device configured to:
receive a request from the PCI device to access data on a memory page of a plurality of memory pages; and
cause a vCPU of the Level 2 virtual machine to use the Level 2 page table for address translation.

14. The system of claim 9, wherein the Level 1 page table and the Level 2 page table are part of an input/output memory management unit (IOMMU).

15. The system of claim 9, further comprising the processing device configured to:
granting, by the Level 0 hypervisor to the Level 1 hypervisor, direct access to the Level 1 page table.

16. The system of claim 9, wherein the I/O virtual address space to be used by the PCI device is assigned by the Level 2 virtual machine.

17. A non-transitory machine-readable storage medium storing instructions that cause a processing device to:

running a Level 0 hypervisor managing a Level 1 virtual machine running a Level 1 hypervisor, wherein the Level 1 hypervisor manages a Level 2 virtual machine, wherein the Level 2 virtual machine is associated with a Peripheral Component Interconnect (PCI) device;

assign an input/output (I/O) virtual address space to be used by the PCI device;

receive, from the Level 1 hypervisor, a guest page table maintained by the Level 1 hypervisor;

generate a Level 1 page table by combining records from the guest page table with records from a host page table maintained by the Level 0 hypervisor;

cause a central processing unit (CPU) of a host computer system to use the Level 1 page table for first level address translations;

generate a Level 2 page table comprising a plurality of Level 2 page table entries, wherein each Level 2 page table entry of the plurality of Level 2 page table entries maps a I/O guest virtual address of the I/O virtual address space to a corresponding Level 2 guest physical address; and cause a device driver of the Level 2 virtual machine to use the Level 2 page table for second level address translation.

18. The non-transitory machine-readable storage medium of claim 17, wherein the Level 1 page table comprises a plurality of page table records, wherein each Level 1 page table record of the plurality of Level 1 page table records maps a Level 2 guest physical address of a Level 2 address space associated with the Level 2 virtual machine to a corresponding Level 0 host physical address of a Level 0 address space associated with the Level 0 hypervisor.

19. The non-transitory machine-readable storage medium of claim 17, further comprising the processing device configured to:

grant, to the Level 2 virtual machine, direct access to the Level 2 page table.

20. The non-transitory machine-readable storage medium of claim 17, further comprising the processing device configured to:

responsive to removing access, of the PCI device, to a memory page, update, by the Level 2 virtual machine, a page table entry of the Level 2 page table.

* * * * *